United States Patent [19]

Scheuch

[11] Patent Number: 4,722,644
[45] Date of Patent: Feb. 2, 1988

[54] MULTI-LIP DRILL

[75] Inventor: Anton Scheuch, Ravensburg, Fed. Rep. of Germany

[73] Assignee: Hawera Präzisionswerkzeuge GmbH, Ravensburg, Fed. Rep. of Germany

[21] Appl. No.: 823,108

[22] Filed: Jan. 27, 1986

[30] Foreign Application Priority Data

Mar. 8, 1985 [DE] Fed. Rep. of Germany ....... 3527934

[51] Int. Cl.$^4$ .............................................. B23B 51/02
[52] U.S. Cl. ..................................... 408/230; 408/704
[58] Field of Search ............... 408/226, 227, 228, 229, 408/230, 199, 211, 223, 241 R, 704

[56] References Cited

U.S. PATENT DOCUMENTS

| | | | |
|---|---|---|---|
| 1,384,733 | 7/1921 | Woods | 408/223 X |
| 2,966,081 | 12/1960 | Kallio | 408/230 |
| 3,778,180 | 12/1973 | Ostrom | 408/226 |
| 4,231,692 | 11/1980 | Brabetz et al. | 408/230 |
| 4,411,563 | 10/1983 | Moon | 408/230 X |
| 4,561,813 | 12/1985 | Schneider | 408/230 |

FOREIGN PATENT DOCUMENTS

| | | | |
|---|---|---|---|
| 3233968 | 3/1984 | Fed. Rep. of Germany | 408/229 |
| 713070 | 9/1966 | Italy | 408/230 |
| 24822 | 2/1980 | Japan | 408/230 |
| 0106710 | 8/1980 | Japan | 408/230 |
| 608745 | 9/1948 | United Kingdom | 408/230 |

OTHER PUBLICATIONS

Werkstatt und Betrieb, Band 115, Nr. 7, 1982, Seiten 437–440, Muenchen, DE; K. Kaeuser: "Bohrer mit Hartmetallschneiden zum Bohren ins Volle", FIG. 1.
Machines Production, Nr. 261, Mai 1980, Seite 27, Boulogne, FR, FIG. 9.

Primary Examiner—Gil Weidenfeld
Assistant Examiner—Glenn L. Webb
Attorney, Agent, or Firm—Spencer & Frank

[57] ABSTRACT

A multi-lip drill is proposed in which an additional auxiliary swarf flute is arranged in the core region of one or more principal swarf flutes in order to enlarge the swarf space.

8 Claims, 3 Drawing Figures

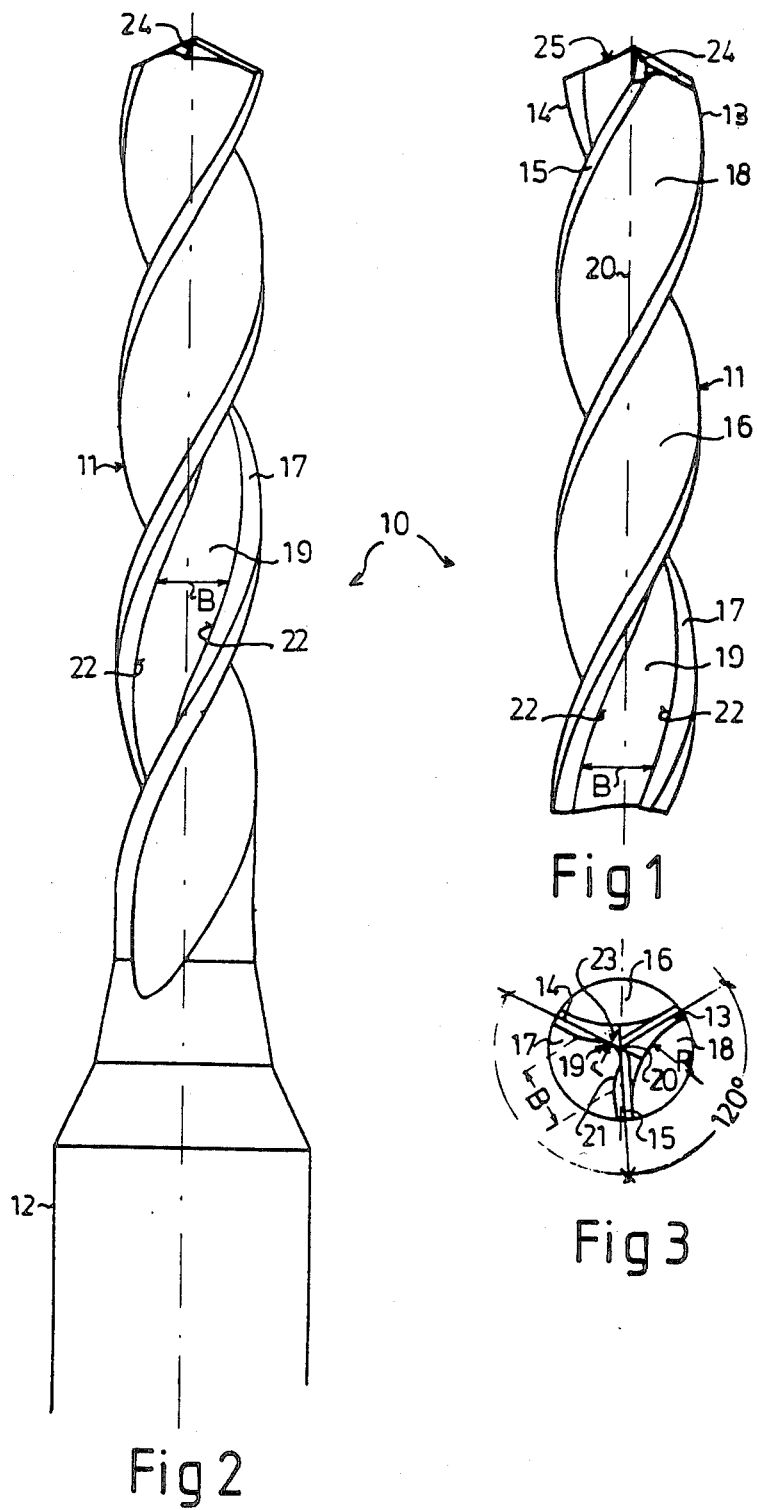

MULTI-LIP DRILL

BACKGROUND OF THE INVENTION

The invention relates to a multi-lip drill, particularly a drill with three cutting lips, preferably for machining printed circuit boards, plastics or metals.

Multi-lip drills are also designated as multi-edge drills. The advantage of such drilling tools lies in the increased number of cutting edges and therefore in an increased drilling capacity, particularly in special materials.

It is known in drills that the size of the swarf flute is one determining factor of the feed pressure, that is to say a swarf flute of large cross-section in proportion to the cross-section of the drilling toll generates a lower feed pressure, because the swarf is eliminated with free mobility only to the extent of this flute cross-section. The region of the material to be removed in the bore in excess of the cross-section of the swarf flute has to be quasi additionally squeezed through the cross-section of the swarf flute. A large swarf flute can therefore discharge larger quantities of swarf for a lower feed pressure. However, for a lower feed pressure the cutting forces, and therefore the wear on the drilling tool, also remain low.

A multi-lip drill with an additional auxiliary flute, inserted in a principal swarf flute and oriented parallel thereto for the discharge of swarf is disclosed in German Patent No. 159,437, and more particularly, there is described therein a spiral flute which exhibits a second continuous flute. This second flute functions to permit an easier discharge of the swarf in spiral drills. To improve this function, it is proposed according to this German Patent that the auxiliary flute widens gradually from the tip towards the shank.

Further, German Auslegeschrift, [published patent application] No. 1,017,438 and French Patent No. 536,208 also disclose auxiliary flutes in the principal swarf flutes which, however, function to bend the swarf so that the latter breaks. No enlargement of the swarf space for easier discharge of the swarf is intended thereby.

SUMMARY OF THE INVENTION

The underlying object of the present invention is to develop a drilling tool of the type initially mentioned so that the required feed pressure is reduced still further and the cutting forces and/or cutting force moments are therefore reduced.

This object is achieved according to the invention in that, in a principal swarf flute of a three-edged multi-lip drill, an auxiliary swarf flute is inserted so that the depth of the auxiliary swarf flute extends approximately to the median axis of the drill.

The invention is based on the discovery that an increase in the cross section of the swarf flute also results in a reduction of the feed pressure and therefore a reduction of the cutting forces. However, the enlargement of the swarf flute cannot be performed immediately, because the cutting edge geometry and/or the geometry of the swarf flute in such drilling tools is dictated by technical factors. The swarf flutes are therefore inserted in spiral shape with a given constant radius of curvature. This has the result that a widening of the web of the relevant cutting edge occurs in the core region of the drilling tool.

Now, according to the invention the tool geometry is improved by inserting in a swarf flute of the multi-lip drill in the region of the drill core, that is to say, in the region of the swarf flute which is located closest to the drill axis, an additional auxiliary swarf flute which extends to, or virtually to the median axis. The principal swarf flute is therefore provided, in its deepest region, with an additional auxiliary swarf flute with a smaller radius or curvature than that of the principal swarf flute.

The multi-lip drill according to the invention has the advantages enumerated below compared to the known drilling tools with auxiliary flutes.

Because the auxiliary swarf flutes extends virtually to the median axis, the full drilling cross-section is engaged by a cutting edge at each revolution of the drilling tool. The feed is accordingly reduced decisively, because sufficient cross-section is present for the total transport of the material. It is particularly important here that even the material in the region of the median axis of the drilling tool is removed by a cutting edge, and does not, as customary, have to be squeezed through the swarf flutes located farther outwards.

Because the auxiliary swarf flute does not extend directly to the median axis, a centring tip is retained on the drilling tool. It is however the nub of the invention to make the auxiliary swarf flute extend as far as possible towards the median axis, in order to permit material in this region to be transported away with low cutting forces.

In the case of resilient materials, such as resins, laminates, et cetera, the resilient material is subjected by the symmetrical transverse cutting edges to a contact pressure which deforms it readily. The material can however escape into the auxiliary flute and is removed totally by the auxiliary flute cutting edge.

In the case of machining non-resilient materials, such as metal, the symmetrical transverse cutting edges must be set back slightly axially relative to the auxiliary flute cutting edge, so that the auxiliary flute cutting edge always remains operative in the inner cross-sectional region. The auxiliary flute cutting edge must therefore always be the uppermost point of the drilling tool.

According to the invention it is further advantageous that only one auxiliary swarf flute is present in a multi-lip drill, because only one auxiliary swarf flute can extend virtually to the median axis without the remaining web cross-sections being decisively weakened.

In the multi-lip drill according to the invention the cutting forces are from 2 to 2.5 times lower than in the case of known multi-lip drills, due to the lower feed pressure and therefore the higher transportability of swarf, or because of an increased transport capacity for equal feed pressure. Due to the characteristic asymmetrical construction of the multi-lip drill according to the invention, no disadvantages regarding vibration characteristics have become known. On the contrary, experiments have shown that the drilling results are excellent due to the cutting edge of the auxiliary swarf flute extending far into the centre.

BRIEF DESCRIPTION OF THE DRAWINGS

Further features and advantages characteristic of the invention will appear from the claims and also from the following exemplary embodiment explained more fully with reference to the drawing, wherein:

FIG. 1 shows a side elevation of the multilip drill according to the invention;

FIG. 2 shows a side elevation of the drill according to FIG. 1 rotated through 90°; and FIG. 3 shows a cross-section through the drilling tool according to the invention.

DESCRIPTION OF A PREFERRED EMBODIMENT

The multi-lip drill 10 illustrated in side elevation in FIGS. 1 and 2 comprises a cutting part 11 and a clamping shank 12. The spiral-shaped cutting part 11 is constructed, in conformity with the illustration in FIG. 3, as a three-lip drill with the three webs 13, 14, 15. The swarf flutes 16, 17, 18 are located between these webs 13 to 15.

Now, according to the invention an additional auxiliary swarf flute 19 is inserted in one of the swarf flutes. The radius r of the auxiliary swarf flute 19 is substantially smaller than the radius R of the swarf flutes 16, 18. The proportion r:R is approximately 1:3 to 1:4, that is to say r is therefore approximately $\frac{1}{3}$ to $\frac{1}{4}$ of R. In the exemplary embodiment the auxiliary swarf flute 19 is worked into the base of the swarf flute 17 so that its depth extends to, or virtually to, the median axis 20 of the drilling tool, in order to permit a removal of the workpiece even in this region. The depth of this additional auxiliary swarf flute is also determined by the fact that the web widths of the webs 13 to 15 do not increase substantially towards the centre point, but are also not substantially weakened by the depth of the auxiliary swarf flute 19. According to the invention, therefore, the depth of the auxiliary flute extends approximately to the median axis 20 or just in front thereof. The latter is in order to retain a centring tip. The auxiliary flute should extend to approximately 1/10 of the drill diameter in front of the median axis 20 of the drill, that is to say to approximately 1/10 mm in front of the median axis 20 in the case of a drill of 1 mm diameter.

According to the invention the cross-section of the auxiliary swarf flute 19 is of arcuate construction with a radius r which is substantially smaller than the constant radius R of the principal swarf flutes 16 to 18. The transition region 21 between auxiliary swarf flute 19 and principal swarf flute 17 is constructed gently and without corners in order to avoid stress peaks and in order to enlarge the swarf space. The width B, illustrated symbolically in FIGS. 1 and 2, of the auxiliary swarf flute 19 within the principal swarf flute 17 corresponds approximately to the end of the transition region 21 between the two grooves 19, 17. The transition edge 22 illustrated in FIGS. 1 and 2 is intended to indicate the transition or the start of the auxiliary swarf flute 19. Actually, however, this is a rounded transition.

The multi-lip drill according to the invention is particularly well suited for machining resilient materials such as resins and laminates and particularly for machining printed circuit boards. Diameter ranges of the drilling tool from 0.4 to 3 mm are used in this field. The controllability of the drilling tool in the range from 0.4 to 0.8 mm diameter is particularly difficult. When the drilling tool according to the invention is used in the small diameter ranges, the auxiliary flute 19 should, if possible, extend to the axial centre 20 in order to drill material in this region with low cutting forces. The resilient material then undergoes a contact pressure from the symmetrical transverse cutting edges 24 of the main cutting edges and becomes slightly deformed. The material is, however, able to escape into the auxiliary groove and is removed totally by the auxiliary flute cutting edge 25. Where resilient material is required to be drilled, the symmetrical transverse cutting edges are located at the same height as the auxiliary flute cutting edge of the drilling tool.

For the machining of metal or of non-resilient material the symmetrical transverse cutting edges 24 must be set back slightly axially relative to the auxiliary flute cutting edge 25, in order that the auxiliary flute cutting edge 25 always comes into action first. The auxiliary flute cutting edge must always be the uppermost point of the drilling tool in this case.

I claim:

1. In a multi-lip drill having a tip, a plurality of principal cutting edges and a plurality of principal spiral swarf flutes each having a constant radius of curvature R for machining resilient and non-resilient materials, and including an additional auxiliary flute inserted in one of the principal swarf flutes, and oriented parallel thereto for the discharge of swarf, the improvement wherein said auxiliary swarf flute is inserted centrally symmetrically within said one principal swarf flute so that, beginning at the tip of said drill, the depth of the auxiliary swarf flute extends approximately to the center axis of the drill.

2. Drill according to claim 1, wherein the depth of said auxiliary flute extends at least to 1/10 of the drill diameter in front of the center axis of the drill.

3. Drill according to claim 1, wherein said auxiliary flute is of arcuate construction in cross-section with a radius of curvature r smaller than the radius of curvature R of said one principal swarf flute, and further including gentle transition regions between said one principal swarf flute and said auxiliary flute.

4. Drill according to claim 1, wherein the proportion of the radii r:R is approximately 1:3 to 1:4.

5. Drill according to claim 1, wherein in the region of said tip said auxiliary flute presents a cutting edge and said principal cutting edges have symmetrical transverse cutting edges which are axially in line relative to the auxiliary flute cutting edge.

6. Drill according to claim 1, wherein in the region of said tip said auxiliary flute presents a cutting edge and said principal cutting edges have symmetrical transverse cutting edges which are axially set back relative to the auxiliary flute cutting edge.

7. Drill according to claim 1, wherein said drill has an outside diameter of 0.4 to 2.0 mm.

8. Drill according to claim 1, wherein said plurality of principal cutting edges is composed of three principal cutting edges.

* * * * *